United States Patent [19]

Barr et al.

[11] 4,122,900
[45] Oct. 31, 1978

[54] MULTIPURPOSE CUSHIONED HORSESHOE

[76] Inventors: Donald H. Barr, 8114 Gorman Ave., Laurel, Md. 20810; Thomas A. Coggins, Box 121, Savage, Md. 20863

[21] Appl. No.: 743,479

[22] Filed: Nov. 19, 1976

[51] Int. Cl.² ............................................. A01L 7/06
[52] U.S. Cl. ....................................................... 168/12
[58] Field of Search ................. 168/DIG. 1, 4, 12, 13, 168/24, 7

[56] References Cited

U.S. PATENT DOCUMENTS

| | | | |
|---|---|---|---|
| 1,111,861 | 9/1914 | Robnett | 168/13 |
| 2,157,826 | 5/1939 | Kearney | 168/13 |
| 2,622,685 | 12/1952 | Dixon | 168/13 |
| 3,090,718 | 5/1963 | Dixon | 168/7 |

FOREIGN PATENT DOCUMENTS 36,107  1935  Netherlands ........................... 168/13

Primary Examiner—William H. Grieb
Attorney, Agent, or Firm—Burns, Doane, Swecker & Mathis

[57] ABSTRACT

A cushioned horseshoe with a lightweight, metal plate and a unitary resilient tread bonded to the entire adjacent surface of the plate and molded to form a raised toe calk, cushioned raised heel calks and raised, self-cleaning traction cleats disposed on a unitary resilient base. The shoe is designed for use on turf, fast track or mud track and for use on any one of the horse's hooves. Cushioning is provided directly to the critical heel area of the hoof by providing heel cushion holes in the heel areas of the plate to permit the heel calks to project through the plate and to resiliently engage the horse's hoof while still maintaining a rigid contact between the remainder of the hoof and the plate to permit the plate to be securely nailed to the hoof.

8 Claims, 5 Drawing Figures

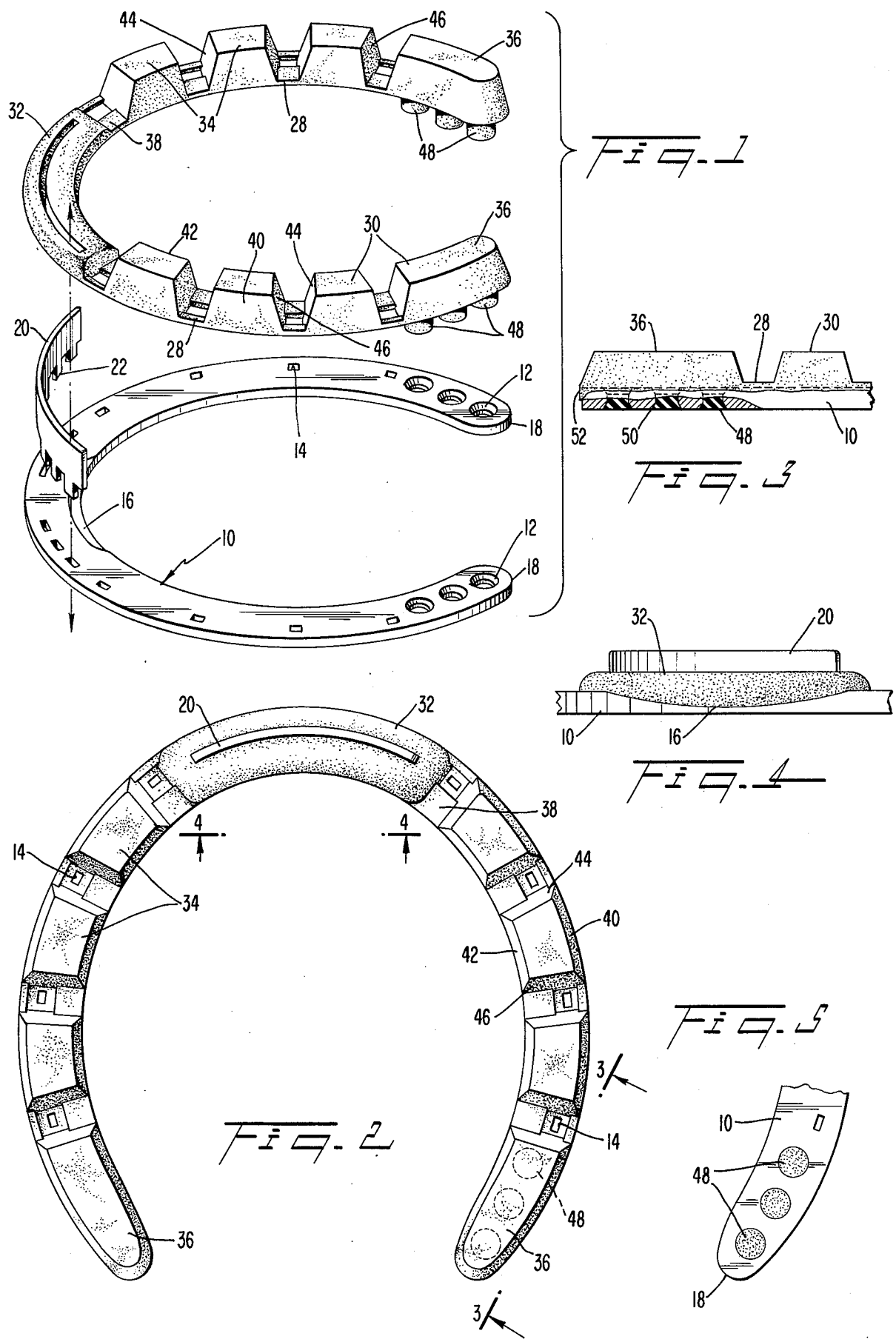

MULTIPURPOSE CUSHIONED HORSESHOE

FIELD OF INVENTION

The present invention relates to an improved horseshoe and more particularly, to a cushioned horseshoe having a resilient tread bonded to a metal plate.

BACKGROUND OF THE INVENTION

The major purpose of a horseshoe is to protect the horse's hooves against injury and to add traction. In a race horse, a properly designed horseshoe is an important piece of equipment which can enhance the horse's racing performance and can add years to the length of the horse's racing career. When a horse is running its hooves hit the ground with a great deal of impact. Under certain running conditions, a horse's stride can cause all of its weight to land on one hoof. This impact is transmitted through the hoof and up through the horse's legs. When a horse runs without shoes, its hoof deforms upon impact and absorbs a portion of the impact forces. A horse that runs with shoes may experience soreness in his hoofs and legs partially because the rigid shoe inhibits the natural deformation of the hoof. Unless great care is taken to protect the horse's legs and hooves against impact and vibration damage, the horse can develop sore feet and lame legs due to corns, cracks and other damage.

In the past a number of different horseshoes have been developed that provide cushioning for a horse's hooves. In many of these horseshoes, cushioning has been provided by merely placing leather, rubber or even plastic pads in a variety of embodiments between the horse's hoof and the metal shoe. This may be undesirable because the presence of a resilient material between the hoof and the shoe may cause the horseshoe nails to vibrate loose so that the shoe may slide on the hoof or even come completely off. Furthermore, the metal shoes have usually been rigid so that the horse's hoof is only cushioned against the vertical component of the forces experienced during running. As a result, few of these previous designs have been entirely satisfactory.

In current practice, a high percentage of horseshoes are made of a flexible metal such as aluminum alloy or other lightweight metals which will deform in a direction transverse to the horse's hoof to permit a degree of flexibility to the hoof. They also have the advantage of being lightweight so that they may be easily carried by the horse.

To add traction, these aluminum plate shoes usually have a steel toe calk and heel calks projecting toward the ground. To further improve traction, some shoes have included individual rubber cleats bonded to the bottom of the shoe.

One such horseshoe is shown in U.S. Pat. No. 2,622,685 to Dixon entitled "Flexible Racing Horseshoe" which provides an aluminum base with a plurality of peripheral flanges and an L-shaped toe calk riveted to the toe portion of the plate. A number of separate rubber cleats are bonded along the bottom of the shoe. The aluminum plate provides lateral flexibility to the horseshoe and the flanges provide a controlled amount of lateral flexibility to the rubber cleats. The Dixon horseshoe does not disclose any cushioning between the aluminum plate and the horse's hoof but relies entirely upon individual cleats to absorb the vertical component of the impact forces experienced by the horse's hoof. Eliminating any cushioning between the plate and the hoof can be unsatisfactory because the pressure of a metal plate directly against the horse's hoof can still cause soreness and other hoof and leg damage. Using individual cleats can be unsatisfactory because they can easily jar loose. When this happens the entire shoe must be replaced.

A second U.S. Pat. No. 3,090,718 to Dixon entitled "Flexible Cushioned Horseshoe" provides a similar overall design but eliminates the peripheral flanges. In this second patent Dixon recognizes that he did not previously appreciate the extent to which cushioning aids a horse. To add further cushioning, he tapers the heel portion of the aluminum plate to provide a greater rubber thickness in the heel area. The second Dixon patent, however, still does not provide any cushioning between the horse's hoof and the aluminum plate and still uses individual cleats.

In the past horseshoes were designed differently for the front and hind hooves of a horse. The hind shoes usually include a metal mud calk on their outside heel portion to add traction. These mud calks can be cast right into the plate or they can be screwed into the plate. The inside heel portion of each hind shoe usually included two metal blocks to control the horse's stride and prevent running down. A horse will run down either from a natural tendency peculiar to a particular horse or to compensate for sore front hooves by bringing its hind hooves farther forward and digging in too hard. This can cause the rear part of its hind ankle to rub against the running surface and chafe or even bleed. The use of blocks on the inside of the hind shoe raises the hoof off the running surface and adds traction to avoid running down. Thus the left and right hind shoes are different from each other and different from the front shoes. This adds to the cost and difficulty of providing proper shoes for a horse.

There is a need for a horseshoe that will accommodate the natural lateral flexibility of the horse's hoof and provide vertical cushioning directly to critical areas of the horse's hoof while still maintaining a secure contact surface between the remainder of the hoof and the horseshoe. There is also a need for a horseshoe of a single design that can be used on any hoof.

SUMMARY OF THE INVENTION

The present invention provides a cushioned horseshoe with a lightweight metal plate and a unitary resilient tread bonded to the entire adjacent surface of the plate and molded to form a raised toe calk, cushioned raised heel calks and raised, self-cleaning traction cleats disposed on a unitary resilient base. Cushioning is provided directly to the critical heel area of the hoof by providing heel cushion holes in the heel areas of the plate to permit the heel calks to project through the plate and to resiliently engage the horse's hoof. The present invention provides a thick cushion equal to the total thickness of the plate and the heel calk while still maintaining a rigid contact between the hoof and the plate that is necessary to permit the plate to be securely nailed to the hoof.

Furthermore, since the heel portion of the tread experiences very high stresses while the horse is running, the design of the present invention whereby the heel calk extends through the plate, provides added strength to the tread and minimizes the possibility that the heel portion of the tread will be jarred off of the shoe while the horse is running. This is particularly important because the heel portion of the tread also provides the function previously provided by metal heel calks. In order to give the horse good traction, this heel portion of the tread must be very strongly connected to the shoe.

Using the strengthened rear portion of the tread as the heel calk also provides a safer shoe by eliminating the metal heel calks which have often damaged horses in the past when the inside heel calk of one shoe will hit and cut the inside of the adjacent leg. This hitting is called clipping and can cause great damage to a horse.

The tread is further strengthened because its individual elements, i.e., toe calk, heel calks and traction cleats are all molded on a unitary base of resilient material. Thus, the forces experienced by the tread tend to be uniformly distributed about the surface of the plate. This makes the shoe more comfortable to wear and more durable. The use of a unitary resilient base bonded to the entire adjacent surface of the plate permits the entire tread to benefit from the added holding strength provided by projecting the heel calk through the plate. Becuase the cushioned heel calk is so strongly fixed to the plate it provides added traction like the metal mud calk used on prior art shoes on the outside of each rear shoe and like the blocks used on the inside of each rear shoe. Thus the same shoe can be used on either hind hoof and on the front hoofs. This feature makes the shoe of the present invention more versatile and reduces the expense and difficulty of providing proper shoes for a horse.

The cushioned horseshoe of the present invention may include a metal toe piece strongly affixed to the plate without using rivets or bolts. Fingers depending from one edge of the toe piece are punched through the plate and the protruding fingers are slotted and flattened to hold the toe piece securely and then sanded smooth.

The tread of the cushioned horseshoe is made of high-quality natural rubber of tire tread quality or other resilient material bonded to a plate made of aluminum, aluminum alloy or other lightweight flexible, and strong metal that may be cold forged to fit the individual horse.

The present invention provides a high quality, lightweight horseshoe which has a continuous tread securely bonded to the aluminum plate. The heel portion of the tread forms a heel calk which protrudes through the aluminum plate to provide significant cushioning in the critical heel area of the horseshoe and to add strength to the entire tread.

This horseshoe is adaptable to turf, fast tracks and mud tracks. It can be used for front and back hoofs. The shoe has increased traction yet the rubber bonded horseshoe has an expected life equal to that of an aluminum racing plate without rubber treads.

DESCRIPTION OF THE DRAWINGS

Other features and advantages of this invention will be apparent from the following description of certain embodiments thereof taken in conjunction with the following drawings wherein:

FIG. 1 is an exploded, perspective view of the aluminum plate, steel toe piece and tread material;

FIG. 2 is a bottom view of the completed horseshoe;

FIG. 3 is a side view shown partially in section of the heel portion of the completed horseshoe shown in FIG. 2;

FIG. 4 is a partial elevational view of the inside of the horseshoe near the toepiece as viewed along the lines 4—4 in FIG. 2; and, FIG. 5 is a partial top view of the completed horseshoe shown in FIG. 2 showing the rubber cushion protruding through the holes in the heel portion of the aluminum plate.

DESCRIPTION OF THE PREFERRED EMBODIMENT

Referring now to FIG. 1 there is shown an exploded view of the horseshoe of the present invention including an aluminum plate 10, an optional metal toe piece 20 and a tread 30. One surface of plate 10, the tread bearing surface, is bonded to tread 30, and the other surface of plate 10, the hoof engaging surface, abuts the hard outer surface of the horse's hoof. Plate 10 is made of lightweight flexible metal which is hard but not brittle and which can be cold forged to allow the finished horseshoe to be custom fitted to the horse's hoof and which is sufficiently flexible to accommodate the natural deformation of a horse's hoof. We prefer to use commercially available hardened aluminum alloy like 2014 T-3 or 2024 T-3 but other materials like magnesium could also be used. Plate 10 has a uniform thickness of between 0.156 inch to 0.160 inch. This thickness is about half of that used for previous aluminum plate shoes.

Plate 10 has three heel cushion holes 12 centered on each heel portion of plate 10. Plate 10 has a uniform width of about 19/32 of an inch. Heel cushion holes 12 are about 7/32 of an inch in diameter. Heel cushion holes 12 are countersunk from both surfaces of plate 10 to eliminate sharp edges. Plate 10 has a plurality of generally rectangular conventional nail holes 14 having a length of approximately 5/32 of an inch and a width of approximately 3/32 of an inch. Size 4, size 4 ½ and size 5 shoes may have three nail holes on each side of the shoe. Size 6, size 7 and size 8 shoes may have four nail holes on each side of the shoe.

The inside edge of plate 10 adjacent the surface on which the tread will be placed, i.e., the tread bearing surface, has a concave bevel 16 having a radius of about 3/16 of an inch and an arc of about 25 degrees. Bevel 16 helps disburse the impact forces experienced by plate 10 when the horse's hoof hits the ground about the entire toe area of plate 10. Without bevel 16, the impact forces would tend to localize at a single point so that plate 10 would tend to break in the toe area.

Edge 18 of the heel portions of plate 10 are radiused to approximately 0.015 inch from the tip of the heel extending back to at least past the third heel cushion hole on both surfaces of both heels. Radius 18 prevents the rubber tread in this area from being cut during impact and also removes sharp edges from the shoe in order to minimize the possibility that the shoe on one foot will clip and cut the adjacent leg of the horse.

An optional metal toe piece 20 having a plurality of downwardly extending fingers 22 may be used. In the preferred embodiment there are two sets of three such fingers 22, each set offset an equal distance from the vertical center plane of toe piece 20. Toe piece 20 is bent to match the contour of the horseshoe in the toe area, i.e., about 30° to 35°.

Toe piece 20 is punched through the central portion of plate 10 so that fingers 22 protrude through a predetermined distance. The protruding end of each finger 22 is then slotted and flattened to hold toe piece 20 securely to plate 10 and then sanded to provide a smooth surface to the bottom of the horse's hoof so as to minimize irritation in this area. We prefer steel toe pieces although other hard metals may be used.

A strip of resilient material having a width equal to the width of plate 10 is bonded to plate 10 and molded into tread 30. We prefer high quality natural rubber tread material of a quality used to retread motor vehicle tires. The tread must be strong enough to withstand the severe forces, especially shearing forces, experienced during running and to withstand the associated thermal stresses generated within the tread. We have found that ORCO PLUS retread rubber sold by Oliver Tire and Rubber Company of Oakland, California and Flemmington, New Jersey is satisfactory.

Referring now to FIG. 2, there is shown a completed horseshoe which includes the optional metal toe piece 20. The rubber tread 30 includes a base portion 28 bonded to the entire tread bearing surface of plate 10 which supports a raised toe calk 32 formed completely about toe piece 20, three spaced apart raised traction cleats 34 on each side of the toe piece 20 and one raised large rubber heel calk 36 on each heel. The base has a significant thickness in the area 38 intervening between the raised toe calk 32 and raised cleats 34 and heel calks 36. This provides better bonding of the tread to plate 10 and cures the significant disadvantage of the prior art wherein individual cleats may be jarred loose from the plate during running. Molded tread 30 is countersunk in the area surrounding nail holes 14 so that the nail head may tightly and rigidly engage plate 10 in the area immediately surrounding nail holes 14. Countersinking the rubber around nail holes 14 in this way prevents the nail from vibrating loose as the rubber tread flexes while the horse is running.

Cleats 34 and heel calks 36 each project the same distance from the tread bearing surface of plate 10. The surface of the cleats 34 and heel calks 36 that engages the running surface is aligned generally parallel to the tread bearing surface of plate 10. Toe piece 20 projects from the tread bearing surface of plate 10 a greater distance than cleats 34 and heel calks 36 so that when the horse is standing on the running surface cleats 34 and heel calks 36 touch the surface and toe piece 20 digs in to the surface. When optional toe piece 20 is used, toe calk 32 projects from the tread bearing surface of plate 10 a lesser distance than cleats 34 or heel calks 36 so that when the horse is standing toe calk 32 clears the running surface.

In the embodiment which omits metal toe piece 20, toe calk 32 is molded to project from the tread bearing surface of plate 10 a distance equal to that of cleats 34 and heel calk 36.

It can be seen that the walls of each cleat 34 are not vertical but are disposed at an angle to the tread bearing surface of plate 10 and that lateral walls 40 and 42 slant toward each other in a direction away from plate 10. Also transverse walls 44 and 46 slant toward each other in a direction away from plate 10. Thus, the space between adjacent cleats 34 is wider at the tip of the cleats than at the base of the cleats. This feature makes the cleat self-cleaning so that dirt, turf or mud will tend to be thrown free of the tread while the horse is running. Heel calks 36 and toe calk 32 (in the embodiment which omits toe piece 20) have similarly slanting walls.

It can be seen in FIGS. 3 and 5 that the rubber projections of heel calks 36 project through the heel cushion holes 12 and plate 10 to provide additional cushioning to the horse's hoof in the critical heel area of a thickness equal to the entire thickness of the tread plus the thickness of plate 10.

In the partially broken away side view of the heel portions of the completed horseshoe, shown in FIG. 3, it is evident that in addition to providing increased cushioning in the heel area, the rubber projections 48 of heel calk 36 help hold heel calk 36 onto the plate 10 so that it is less apt to be jarred loose during running. The countersinking on the hoof engaging surface of plate 10 provides a cavity into which projections 48 are molded to form a flange 50 to provide additional holding power for heel calk 36 and tread 30. In FIG. 3, it is also evident that the trailing edge 52 of heel calk 36 extends down around the edges of the heel portions of plate 10 so as to limit the amount of metal showing in this area and to help minimize the danger of the shoe clipping the adjacent leg of the horse during running.

In FIG. 4 it is shown that rubber tread 30 is molded into concave bevel 16 in the toe area to provide added thickness and to enhance cushioning.

It can be seen that the cushioned horseshoe of the present invention provides a horseshoe which is adaptable to turf, fast track or mud racing. Providing a significant thickness of rubber about the entire working surface of the horseshoe provides better bonding for the tread and minimizes the possibility of individual cleats being jarred loose during running. Providing a heel cushion which projects through plate 10 in the critical area of the heel provides added protection and comfort for the horse's hoof while maintaining a secure contact between the hoof and the shoe.

It will be understood that the particular horseshoe illustrated in this preferred embodiment is susceptible of considerable modification without departing from the inventive concept herein disclosed. Consequently, it is not intended that this invention shall be limited to the precise detail disclosed but only as set forth in the following claims.

I claim:

1. A cushioned horseshoe for a racehorse comprising:
   a generally "U" shaped metal horseshoe plate;
   having a generally rectangular cross section of substantially uniform thickness;
   having a hoof engaging surface and a tread bearing surface;
   having a plurality of conventional nail holes extending through said plate and spaced longitudinally therealong, the last nail hole on each arm of said "U" shaped plate being spaced from the free ends thereof;
   a heel portion extending from the last of said nail holes on each arm of said "U" shaped plate longitudinally therealong to the free ends thereof;
   having one or more heel cushion holes through each heel portion of said plate from said hoof engaging surface to said tread bearing surface;
   a unitary resilient tread bonded to substantially the entire tread bearing surface of said plate and molded to include:
   a base portion of uniform thickness bonded directly to the tread bearing surface of said plate and extending substantially thereacross;
   a toe calk raised above said base portion;
   a heel calk raised above said base portion on each heel portion thereof, said base including in each said heel portion projections extending through said heel cushion holes in said plate and adapted to resiliently engage the horse's hoof to provide a substantial thickness of resilient cushioning material for the horse's heel equal to the combined thickness of said projection, said base and said heel calk; and, a plurality of traction cleats raised above said base and distributed from said toe calk to said heel calks and positioned between said nail holes.

2. Cushioned horseshoe according to claim 1 wherein said plate is made of aluminum.

3. Cushioned horseshoe according to claim 1 wherein said resilient tread is made of natural rubber.

4. The horseshoe according to claim 1 further including a steel toe piece affixed to said plate and projecting a distance from said tread bearing surface greater than that of said raised toe calk.

5. The cushioned horseshoe according to claim 1 wherein the opposing side walls of the said raised tread portions slant toward each other in the direction away from said tread bearing surface to facilitate the automatic removal of dirt, mud or turf from between the tread portions while the horse is running.

6. The cushioned horseshoe according to claim 1 wherein said base includes a countersunk portion in an area about said nail holes of sufficient size to permit the head of nails that will be used to affix the horseshoe to the horse's hoof to bear against said tread bearing surface of the plate, substantially without intervening tread material.

7. The cushioned horseshoe according to claim 1 wherein said plate includes concave bevel on the inside edge of said tread bearing surface in the toe area thereof to facilitate the distribution of forces throughout the toe area.

8. The cushioned horseshoe according to claim 1 wherein said heel cushion holes are countersunk from said tread bearing surface and said hoof engaging surface to eliminate sharp metal surfaces and to permit a flange to be molded on said tread projection to help hold said tread to said plate.

* * * * *